(12) United States Patent
Hart

(10) Patent No.: US 6,182,680 B1
(45) Date of Patent: Feb. 6, 2001

(54) RAIN WATER VESSEL

(76) Inventor: George Henry Hart, 4 Kimberly Road, Dandenong Victoria 3175 (AU)

(*) Notice: Under 35 U.S.C. 154(b), the term of this patent shall be extended for 0 days.

(21) Appl. No.: 09/297,326

(22) PCT Filed: Oct. 31, 1997

(86) PCT No.: PCT/AU97/00736

§ 371 Date: Apr. 29, 1999

§ 102(e) Date: Apr. 29, 1999

(87) PCT Pub. No.: WO98/19019

PCT Pub. Date: May 7, 1998

(30) Foreign Application Priority Data

Oct. 31, 1996 (AU) .................................................. PO3341

(51) Int. Cl.$^7$ .............................................................. G05D 11/00
(52) U.S. Cl. ........................................................................ 137/122
(58) Field of Search ..................................... 137/120, 122

(56) References Cited

U.S. PATENT DOCUMENTS

| | | | |
|---|---|---|---|
| 549,835 | * 11/1895 | Van Benthuysen | 137/120 |
| 659,541 | * 10/1900 | Martin | 137/122 |
| 1,524,102 | * 1/1925 | Nietfeld | 137/122 |

FOREIGN PATENT DOCUMENTS

| | | | |
|---|---|---|---|
| 22 812/25 | 5/1926 | (AU) . | |
| 36 697/50 | 1/1951 | (AU) . | |
| 18 541/56 | 11/1957 | (AU) . | |
| 39 831/85 | 9/1985 | (AU) . | |
| 24 512/88 | 1/1989 | (AU) . | |
| 65 958 /90 | 5/1991 | (AU) . | |
| 73 520/91 | 2/1992 | (AU) . | |
| 56 343/94 | 10/1994 | (AU) . | |
| 16 551/95 | 11/1995 | (AU) . | |
| 72845 | * 1/1894 | (DE) | 137/122 |
| 43 265 87 | 8/1994 | (DE) . | |
| 51 720 2 | 12/1992 | (EP) . | |

* cited by examiner

*Primary Examiner*—Stephen M. Hepperle
(74) *Attorney, Agent, or Firm*—Birch, Stewart, Kolasch & Birch, LLP

(57) ABSTRACT

A rain water vessel (1) includes a water inlet (21), a main tank (26), a dump tank (27) inside the main tank, and a diverter valve (31, 32). The diverter valve (31, 32) is, after a period without rainfall of less than 1 hour, normally in a first condition in which it directs rain water entering the inlet (21) into the dump tank (27). A float (33) is operated when the dump tank is filled with water to a predetermined amount, to cause the diverter valve to be put in a second condition in which it causes the rain water to flow to the main tank (26). A drain (34, 36) lowers the amount of water in the dump tank over a period of time in excess of 1 minute by outflow to exterior of the vessel (1).

12 Claims, 3 Drawing Sheets

RAIN WATER VESSEL

FIELD OF THE INVENTION

This invention relates to a rain water vessel.

BACKGROUND TO THE INVENTION

In many parts of Australia, households are entirely reliant on rain water for their household use.

The last may be so because the household is not provided with a mains reticulation supply such as by being too remote from such a supply or because locally available artesian water is not of a quality suitable for household use or perhaps, merely, that the colour or taste is not acceptable to a household.

Where a household is reliant upon rain water, it is usual to collect rain water from roofs of houses, garages, sheds and often every available surface via some collection channelling such as spouting and to deliver the rain water collected to large tanks which may be above ground or below ground or partly above ground and partly below ground.

Such tanks have commonly been made of corrugated galvanised iron but more recently concrete and fibreglass tanks have been used.

Within suburban areas of Australia there is usually a mains reticulation supply of water but to many people the water supplied is not considered to be of particularly high quality.

This consideration of quality may arise out of the fact that most mains reticulation supply deliver water which may have been chlorinated and which may contain other chemicals and further which may contain fluoride which can be unacceptable to many people.

Many suburban houses have a roof area quite sufficient to collect a substantial amount of rain water at least for drinking and washing purposes although probably not also for garden watering purposes but nowadays few people wish to have large tanks on their land having regard to the amount of space that those tanks might take up and also due to the fact that those tanks are usually not visually attractive.

Further, most suburban households would be content with a relatively small tank of rain water to be intended for use only as drinking water or as cooking water and for other water requirements, such as washing and garden water, the household may be quite content to rely upon the mains reticulated supply.

Thus, it is postulated that a suburban household could be quite content with a small rain water vessel for the limited purposes of drinking and cooking.

While it is possible to build a tank of reasonably small size, say 300 liters or less, and it may be possible to locate that tank in a position in which it is not visually obtrusive or objectionable, there are other problems involved of collecting rain water in a suburban environment.

One problem of a small rain water vessel is that it will fill quickly and hence when rain commences it can reasonably be expected that the rain water vessel will be filled within a short time of commencement of rain.

However, various oxidation products collect upon roofs of houses and the atmosphere in a suburban environment is not particularly clean as it contains sulphuric acid, sulphonic acid, nitric acid, hydrogen chloride, nitrous oxide and other pollutants.

Many of those pollutants are washed from the roof and the atmosphere during an initial period of raining and thus rain water in, say, the first five minutes of a rainfall is likely to be substantially polluted and such pollutants will pass into the rain water.

In the context of a large tank, say 3000 liters or above, the amount of pollutants collected in the tank may not be considered to be very significant but in respect of a small tank of say 300 liters or less which will fill quickly, it will be found that the water in the small tank will be relatively more polluted than would be the water in a large tank.

Thus, it is considered that during a period of continuous rain, the initial rainfall will be heavily polluted but the later rainfall will be clean and relatively pure.

This is considered further below.

Water is the simplest chemical compound of importance to living things, the most common molecule in the human body is water, most of the chemical reactions that occur in the body require water, and many properties of water make it essential to life processes.

People want drinking water that is free of bacteria, sparkling clear, and without an objectionable taste or odour. So after water is drawn from a source, it is piped into a treatment plant. The plant may put the water through one or several processes, depending on the quality of the untreated water, and on a city's standards. Many cities use three basic processes: (1) coagulation and settling, (2) filtration, and (3) disinfection. All requiring the addition of various chemicals, mainly the chemical chlorine. The weight of evidence suggests that chlorination by-products pose substantial cancer risks that should be reduced.

Alternatives must provide a similar level of protection, excluding the dependence of chemical additives. Perhaps the most viable alternative is point of use water treatment units.

Applicant has considered a filterised water tank ideally suited for most homes and units of all sizes. Applicants tanks are mostly made from high quality grade 304 stainless steel.

Rainwater tanks have been used for the collection of drinking water for many years by the rural community. In the urban areas, however, water tanks are deemed to be unsuitable because of the presence of airborne contaminants, often lead from exhaust emissions. (It is good news that air lead levels in Australia's major cities have fallen dramatically following the introduction of unleaded petrol in 1985. For example, in Sydney there was a 60% fall in lead in the air over the 12 months to November, 1994, and another significant drop is anticipated following further reductions in the lead content of leaded petrol). Applicant's unique filtration system is hoped to ensure airborne pollutants combined with rainwater, are diverted away into the downpipe.

The problem of roof pollution, is also considered by Applicant's system. The rainwater runs through desirably a stainless steel sieve which reduces leaves, etc., and from there flows into a dump tank. This tank holds 18 liters of the initial rainwater, which may be contaminated. This unclean water slowly filters out into an overflow pipe and then into the downpipe. When the dump tank is full, the remainder of the rainfall gets diverted into the main body of the tank, which stores 230 liters. This is the cleanest water obtainable from the rainfall.

Every rainfall is desired to pass through the filtration system, and the clear water desirably enters and circulates with the stored water. This process hopefully ensures the drinking water remains fresh.

Not every rainfall will help fill the main storage section. On days with only the occasional drizzle, there would not be enough consistent rainfall to keep the dump tank full.

However, even this rainfall is beneficial as it helps dispose of roof contaminants, and assists with keeping the guttering clean and ready for the next rainfall.

The World Health Organisation in conjunction with Agriculture and Resource Management Council of Australian and New Zealand, has defined guideline values to represent the level of additives that ensures an aesthetically pleasing drinking water, and does not result in any significant risk to the health of the consumer. In recent years, however, there have been calls by some community groups for water authorities to stop adding certain chemicals to water supplies.

Improvements in water treatment and management have been heralded as the single most important public health initiative ever to be adopted in developed countries. As our population centres grow, increasing demands are being placed on our water resources. Not only is the water itself being placed under stress, but also the systems which collect and deliver it to our taps.

Applicant considers its tanks are a useful solution to the health conscious water consumers, and also to people who live in areas which have particular problems with tap water. It can be used in combination with existing rural water tanks. It is an affordable alternative to tap-water filtration units, and perhaps in the long term, to bottled spring and mineral water.

Some of the chemicals used in water supplies have come under scrutiny, as have treatments like aluminium and additives like fluoride. The debate about whether they should be used has been continuing for years. Those people concerned with chemicals in drinking water can be reassured that their health is not at risk if they consume rainwater for what that reassurance is worth.

Some areas can have dirty water problems due to corrosion of household plumbing pipes and water mains pipelines, or are situated near the end of a water mains pipeline, and have to deal with continual chlorine build up. This problem is non-existent with Applicant's tanks.

The sales of bottled spring water and tap-water filtration units is growing. After the initial purchase of a tank, there are no ongoing costs for replacement parts or water supplies.

A tank offers the suburban residents the option of owning their own private water supply. They are reassured that the water consumed is free of any additives. Tank water does not require in Applicant's view, any chemicals to improve its drinking qualities, the water is soft and refreshing and also beneficial for cooking purposes.

Australian water quality is accepted as one of the best in the world, and yet even here many people choose to improve it by using tap filters, or choose to buy bottled water.

The most frequent concern about drinking water is its bacteriological quality. Stainless steel is Applicant's choice for its hygienic superiority and its corrosion resistance over other materials.

The present invention seeks to provide apparatus which will reject an initial component of a period of rain but accept a later component of that period of rain.

SUMMARY OF THE INVENTION

The present invention provides:
a rain water vessel comprising
a water inlet,
a main tank,
a dump tank,
a diverter valve, wherein the diverter valve is, after a period without rainfall of less than 1 hour, normally in a first condition such that on rainfall commencing to direct rain water entering the inlet to cause the rain water to flow to the dump tank, control means operative, on the dump tank being filled with water to a predetermined amount, to cause the diverter valve to be put in a second condition such that on rain fall continuing to direct rain water entering the inlet to cause the rain water to flow to the main tank, and drain means operative, when the dump tank contains said predetermined amount, to lower the amount of water in the dump tank over a period of time in excess of 1 minute by outflow to the exterior of the vessel.

PREFERRED ASPECTS OF THE INVENTION

Preferably the diverter valve comprises a chute.

Preferably the chute is pivotally mounted such that in one pivoted position it is inclined towards the dump tank and in another pivoted position it is inclined towards the main tank.

Preferably the chute is located directly below the inlet.

Preferably the control means comprises a float.

Preferably the float is directly connected to the chute although indirect connection is possible.

In one instance, the drain means comprises at least one orifice of a diameter such as to achieve the desired rate of outflow. Preferably the at least one orifice is provided by a filter.

The drain means may comprise a valve operative in use to vary the rate of outflow.

Preferably the drain means will substantially drain the dump tank in about 5 minutes or less.

Preferably the inlet has a sieve to catch leaves and debris.

Preferably the inlet comprises a spigot opening upwards and a socket fitted with an ingress tube; the socket being adapted to fit over the spigot.

In the last arrangement, the socket may be lifted off the spigot to allow cleaning of the sieve.

Preferably a flexible pipe is provided to connect the ingress tube to a downpipe of roof spouting.

The float may be coupled to the chute via a lost motion linkage in which it is not until the float has risen to a first, higher, level that the chute will move to direct water to the main tank but in which it is not until the float has fallen to a second, lower level, that the chute will move to direct water to the main tank.

Such a lost motion linkage can be achieved by mounting the float slidably on a rod.

Another lost motion linkage is achieved by mounting the float on an arm which in turn is pivotally mounted to the chute to move between first and second abutments which will define the first level and the second level.

The ratio of the volume of the dump tank to the volume of the main tank is not critical but about 1:15 seems to work well. However, the ratio should be decided by consideration of the amount of pollutants and the rainfall of a region.

The volume of the dump tank is preferably not less than 15 liters.

The volume of the main tank is preferably not less than 200 liters.

An overflow from the main tank may be provided.

That overflow is desirably below any level of communication between the dump tank and the main tank.

An overflow from the dump tank may be provided.

The vessel is preferably substantially formed of stainless steel although other materials may be used.

The present invention will now be illustrated by way of non-limiting example only with reference to the accompanying photographs and the accompanying drawings.

DETAILED DESCRIPTION WITH RESPECT TO THE DRAWINGS

Figure 1:
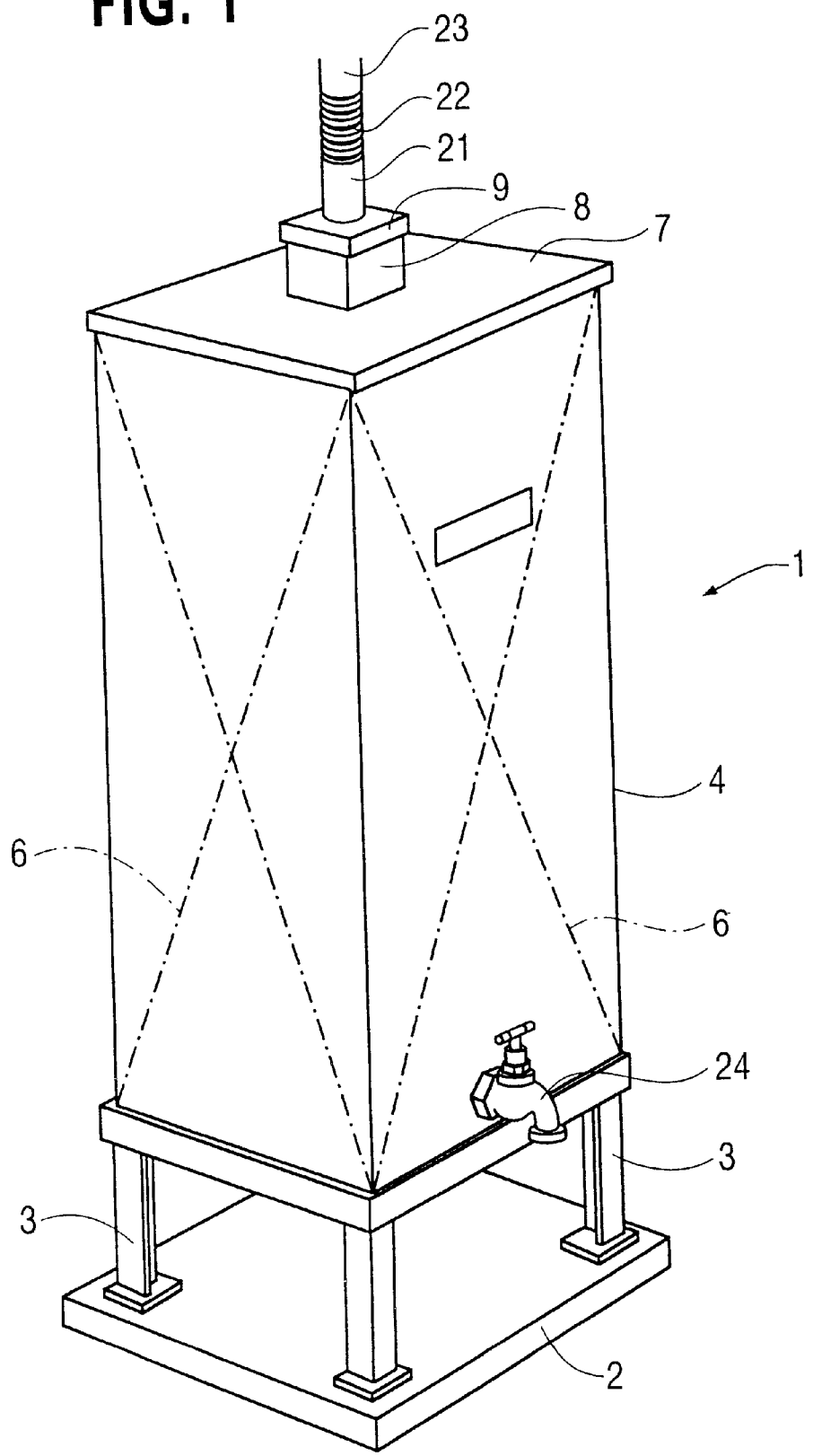
FIG. 1 is an isometric view of a rain water vessel in accordance with this invention.

In the drawings there is shown a rain water vessel 1.

The rain water vessel 1 comprises a concrete base 2 and legs 3 which support a main body 4.

The main body 4 has deform lines 6 which aid the appearance, the structural integrity and reduce the liability of panels to bow outwardly or inwardly.

The main body 4 is provided with a removable lid 7 on which is mounted an inlet spigot 8.

Mounted on the top of the spigot 8 is a socket 9 which is provided with an ingress tube 21.

The ingress tube 21 is connected via a flexible tube 22 to a downpipe forming part of a house rain water collection system usually involving spouting.

The rain water vessel 1 further comprises an outlet tap 24 whereby water from within the main body 4 may be drawn.

The main body 4 comprises a main tank 26 and a dump tank 27.

The dump tank 27 is isolated from the main tank 26 excepting at the top.

An abutment 28 is located within the spigot 8 and serves to support a removable sieve 29 for catching leaves and debris.

Figure 2:
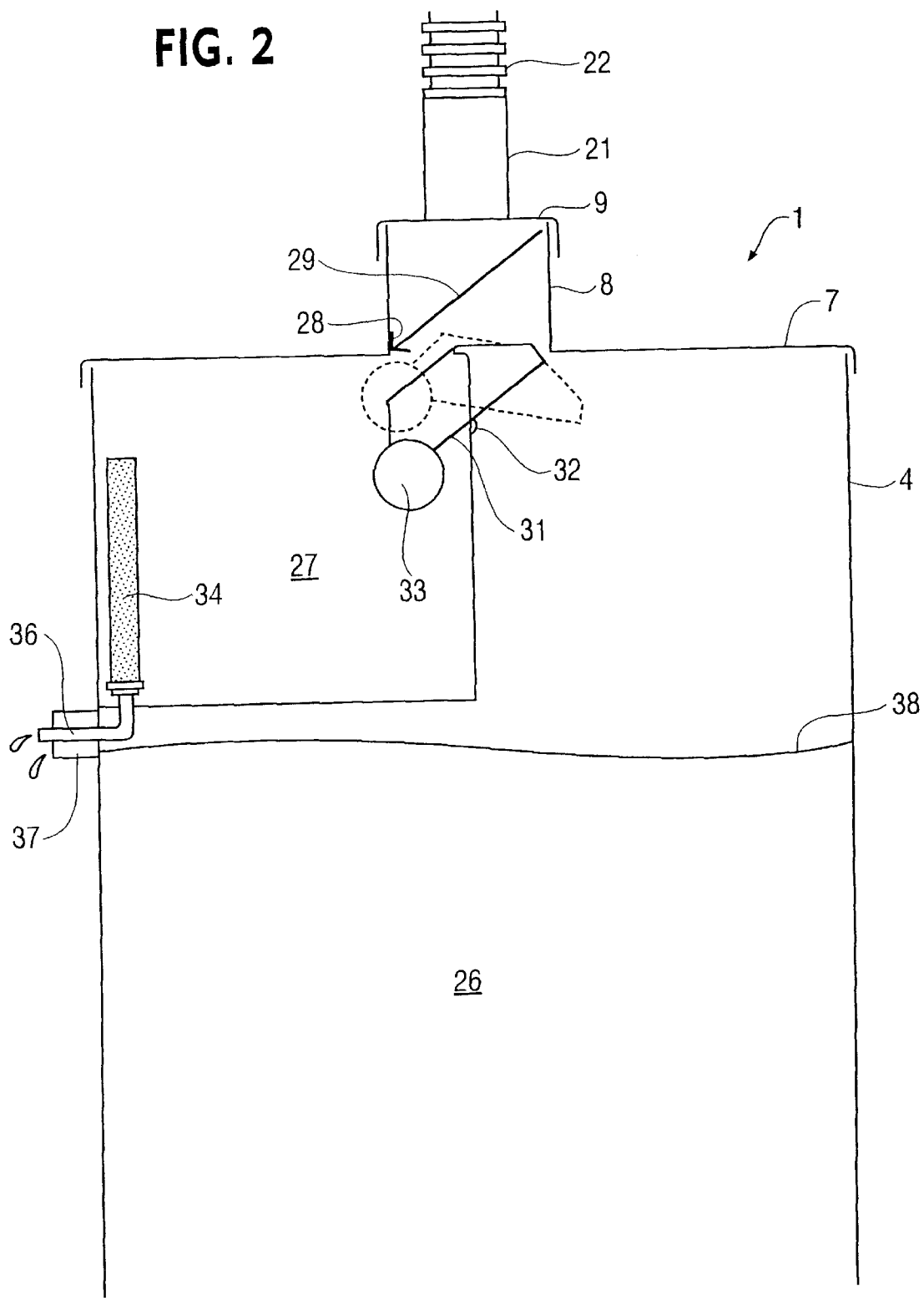
FIG. 2 is a schematic cross-sectional view of the rain water vessel of FIG. 1.

Extending between the main tank 26 and the dump tank 27 is a chute 31 which is mounted to pivot on a pivot 32 from the solid line position shown in FIG. 2 to the dash line position shown in FIG. 2.

The chute 31 is provided with a float 33.

Within the dump tank 27 is a 30 mesh filter 34 which is connected to an outlet pipe 36.

An overflow pipe for the main tank 26 is provided to ensure that the water level 38 has a maximum.

In use, the chute 31 will be in the solid line position shown in FIG. 2 and, when it commences to rain, water will pass down the downpipe 23, through the flexible tube 22, through the spigot 8, through the sieve 29 and to the chute 31 whereupon the rain water will be directed into the dump tank 27.

That is the state of affairs at the commencement of rainfall and it is to be noted that the commencing rain can be considered to be carrying various pollutants which will pass into the dump tank 27.

When the dump tank commences to fill the float 33 will rise and cause the chute 31 to take up the position shown in dash lines in FIG. 2 whereupon water entering will pass into the main tank 26 and proceed to fill the main tank 26.

Since it is desirable to be rid of the water in the dump tank 27, a 30 mesh filter 34 is provided connected to an outlet pipe 36.

The filter 34 will allow water in the dump tank to slowly empty and an emptying time of about 5 minutes is considered desirable.

Thus, it will be appreciated that an initial fall of rain will be captured in the dump tank and will be disposed of but continuation of rain will cause rain water to be passed into the main tank 26 freer of pollutants than would otherwise be the case.

In our preferred form the main tank has a volume of about 230 liters and the dump tank has a volume of about 15 liters. Clearly, other sizes can be made.

Figure 3:
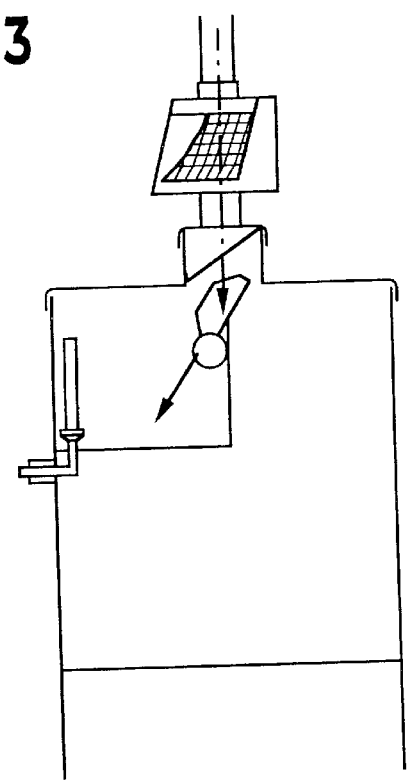
FIG. 3 is a schematic cross-sectional view of an alternative construction.
Figure 4:
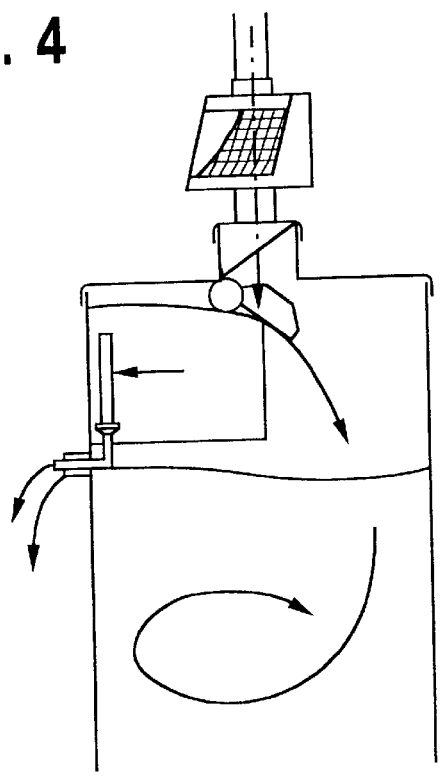
FIG. 4 is a schematic cross-sectional view of another alternative construction.

In a slightly different construction shown in FIGS. 3 and 4, every time it rains, water droplets form on tiny particles of matter known as condensation nuclei. Such nuclei consist of dust, salt from ocean spray, and chemicals. Some of these chemicals form when gases in the air react with each other, while others are given off by industrial plants and motor vehicles. The first portion of water droplets clean the air by absorbing dust and chemical particles on their journey to the earth. (air is clearer and fresher after a rainfall). The initial rainfall also clears pollutants from roofs and gutters. Applicant's filtration system diverts the tainted water away, ensuring only the clean rainwater enters the drinking water supply.

With regard to how this is done, the rainwater runs through a stainless steel sieve which eliminates leaves, etc., and from there flows into the dump tank. This tank holds the initial rainwater which may be tainted by dissolved material from the guttering. This unclean water slowly filters out into an overflow pipe and then into the downpipe. When the dump tank is full the remainder of the rainfall gets diverted into the main body of the tank, which stores 230 liters. This is the cleanest water obtainable from the rainfall. Every new rainfall continues through the filtration cycle, and then enters and circulates with the stored water. The main body is fitted with an overflow outlet at the 230 liter level, to enable excess water to discharge through the overflow pipe, and disperse to a storm water downpipe. This process ensures the drinking water remains fresh.

Not every rainfall will help fill the main storage section. On days with only the occasional drizzle, there would not be enough consistent rainfall to keep the dump tank full. However, even this is beneficial as it helps dispose of roof contaminants and assists with keeping the guttering clean and ready for the ensuing rainfall.

With the ever increasing usage of mist spraying in the agricultural industry, the once considered, solitary water collection system in the country, the humble water tank, is now under scrutiny with the increasing uncertainty about how much chemical spray is settling on catchment roofs, and therefore being washed into water tanks.

Applicant's tanks can be used as an additional unit to existing water tanks. The water stored in Applicant's tanks has passed through the filtration system, which is excellent for drinking and kitchen use. (Tap filters and water purifiers are not needed to improve the quality). The water diverted into the dump tank and excess water that flows through the overflow outlet, can be connected to the down pipe that feeds existing tanks. When Applicant's tank is used in this type of situation, it enables one to have filtered water stored in his tank, for drinking etc., with all the excess water going to a large existing tank for other domestic water requirements around the house, without the loss of one drop of water.

The Applicant's tank is manufactured of 304 grade stainless steel, the base is 1.2 mm thick, the side walls are 0.9 mm thick, the balance of stainless steel material used in the construction of the tank unit is of 0.7 mm thick. Even parts like pins, hinges, and filter screens are all made from stainless steel material. The outlet tap and overflow fitting are made from brass, the same as standard fittings around homes.

The tank is supported on a powder coated stand for total corrosion protection in the colour of black.

Hoses supplied with the tank are all made from E.V.A. material. They are approved for food contact use, are non toxic and have excellent UV resistance.

The tanks require little maintenance. Any build up of leaves on the sieve are easily removed. This stainless steel sieve is removable and easy to clean, and it should be checked periodically. A layer of sediment will settle on the floor of the dump tank over time and this can be wiped and rinsed clean. It is recommended to hose out the entire tank every 2 to 3 years. The exterior only needs the occasional wipe with hot soapy water and a soft cloth. Metal scourers, etc., should not be used because small pieces of iron will remain on the surface, and rust stains can appear on these spots.

The average home has between 2 to 4 water catchment zones. (Equal to the amount of downpipes). The tank is installed to one catchment area only, and this is adequate to supply the tank with enough water. It is also suitable to attach tank to the guttering of a patio or even the garage roof can be utilised. Only the section of the guttering that supplies water to the tank requires periodical maintenance.

Concrete tile, terra cotta tile and colourbond roofing are all suited for the collection of drinking water, but asbestos roofs are not (pre 1970). Old house roofs painted with lead based paints and roofs painted with tar based paints are unsuitable.

Moss growth on roofs can promote a green colouring of the water, so can leaves, mainly from native trees, such as gum leaves collected in this sieve filtering area can create a yellowing of the water.

In conditions where leaves are present it is advisable to fit a leaf diverter to the tank unit.

New roofs, or those recently painted, should be allowed to weather for a few months prior to the collection of drinking water, this first quantity of water can be safely used throughout garden areas.

The claims, illustrations, and drawings, if any, form part of the disclosure of this specification as does the description, claims, illustrations, photographs and drawings of any associated provisional or parent specification or of any priority document, if any, all of which are imported hereinto as part of the record hereof.

Finally it is to be understood that various alterations, modifications and/or additions may be incorporated into the various constructions and arrangements or parts without departing from the spirit and ambit of the invention.

The claims defining the invention are as follows:
1. A rain water vessel comprising
   a water inlet,
   a main tank,
   a dump tank positioned inside the main tank,
   a diverter valve,
   wherein the diverter valve is, after a period without rainfall of less than 1 hour, normally in a first condition such that on rainfall commencing to direct rain water entering the inlet to cause the rain water to flow to the dump tank,
   control means operative, on the dump tank being filled with water to a predetermined amount, to cause the diverter valve to be put in a second condition such that on rain fall continuing to direct rain water entering the inlet to cause the rain water to flow to the main tank, and
   drain means operative, when the dump tank contains said predetermined amount, to lower the amount of water in the dump tank over a period of time in excess of 1 minute by outflow to the exterior of the vessel
   wherein the diverter valve comprises a chute with the chute being pivotally mounted on the dump tank such that in the first condition it is inclined towards an interior of the dump tank and in the second condition it is inclined toward outside the dump tank and into the main tank.
2. A rain water vessel as claimed in claim 1, wherein the chute is located directly below the inlet.
3. A rain water vessel as claimed in claim 1, wherein the control means is a float.
4. A rain water vessel as claimed in claim 3, wherein the float is directly connected to the chute.
5. A rain water vessel as claimed in claim 1, wherein the drain means comprises at least one orifice of a diameter such as to achieve a desired rate of outflow and the at least one orifice has a filter.
6. A rain water vessel as claimed in claim 1, wherein drain means may comprise a valve operative in use to vary a rate of outflow.
7. A rain water vessel as claimed in claim 1, wherein the drain means will substantially drain the dump tank in about 5 minutes or less.
8. A rain water vessel as claimed in claim 1, wherein the inlet has a sieve to catch leaves and debris.
9. A rain water vessel as claimed in claim 1, wherein the inlet comprises a spigot opening upwards and a socket fitted with an ingress tube; the socket being adapted to fit over the spigot.
10. A rain water vessel as claimed in claim 1, wherein a flexible pipe is provided to connect the ingress tube to a downpipe of roof spouting.
11. A rain water vessel as claimed in claim 1, wherein the float is coupled to the chute via a lost motion linkage in which it is not until the float has risen to a first, higher, level that the chute will move to direct water to the main tank but in which it is not until the float has fallen to a second, lower level, that the chute will move to direct water to the main tank.
12. A rain water vessel as in claim 1, wherein the dump tank has a bottom floor that is vertically above a bottom floor of the main tank.

* * * * *